(12) United States Patent
Marra et al.

(10) Patent No.: US 10,303,727 B2
(45) Date of Patent: May 28, 2019

(54) PRESENTING CONTENT TO A SOCIAL NETWORKING SYSTEM USER BASED ON CURRENT RELEVANCE AND FUTURE RELEVANCE OF THE CONTENT TO THE USER

(71) Applicant: Facebook, Inc., Menlo Park, CA (US)

(72) Inventors: Gregory Matthew Marra, San Fransico, CA (US); Yael Gavish, San Fransico, CA (US)

(73) Assignee: Facebook, Inc., Menlo Park, CA (US)

( * ) Notice: Subject to any disclaimer, the term of this patent is extended or adjusted under 35 U.S.C. 154(b) by 812 days.

(21) Appl. No.: 14/707,603

(22) Filed: May 8, 2015

(65) Prior Publication Data

US 2016/0328481 A1 Nov. 10, 2016

(51) Int. Cl.
*G06F 16/24* (2019.01)
*G06F 16/9535* (2019.01)
*H04L 29/08* (2006.01)
*G06F 16/248* (2019.01)
*G06F 16/2457* (2019.01)
*G06Q 50/00* (2012.01)

(52) U.S. Cl.
CPC ........ *G06F 16/9535* (2019.01); *G06F 16/248* (2019.01); *G06F 16/24575* (2019.01); *G06F 16/24578* (2019.01); *G06Q 50/00* (2013.01); *H04L 67/306* (2013.01)

(58) Field of Classification Search
CPC ........... G06F 17/3053; G06F 16/24575; G06F 16/24578
See application file for complete search history.

(56) References Cited

U.S. PATENT DOCUMENTS

| | | | |
|---|---|---|---|
| 2008/0040673 A1* | 2/2008 | Zuckerberg | G06F 17/30867 715/745 |
| 2010/0049852 A1* | 2/2010 | Whitnah | G06Q 10/10 709/226 |
| 2010/0205169 A1* | 8/2010 | Narayan | G06F 17/3089 707/711 |

(Continued)

OTHER PUBLICATIONS

Beitzel et al., "Temporal Analysis of a Very Large Topically Categorized Web Query Log", 2006, Journal of the American Society for Information Science and Technology, 58(2), DOI 10.1002/asi.20464.*

*Primary Examiner* — Apu M Mofiz
*Assistant Examiner* — Sheryl L Holland
(74) *Attorney, Agent, or Firm* — Fenwick & West LLP

(57) ABSTRACT

A social networking system generates a feed of content items for presentation to a user based on measures of relevance of the content items to the user at a time when the feed is to be presented and at one or more future times. Content items are associated with value functions representing measures of relevance of the content items to the user over time. Based on the value functions for various content items, the social networking system determines an expected amount of user interaction with the feed when the feed is to be presented as well as predicted amounts of user interaction with the feed at one or more future times. Content items are selected for inclusion in the feed to maximize a combination of the expected amount of user interaction and the predicted amounts of user interaction with the feed.

18 Claims, 4 Drawing Sheets

(56) References Cited

U.S. PATENT DOCUMENTS

| | | | |
|---|---|---|---|
| 2012/0158501 A1* | 6/2012 | Zhang | G06Q 30/0255 705/14.53 |
| 2012/0158502 A1* | 6/2012 | Chung | G06Q 30/0255 705/14.53 |
| 2013/0057696 A1* | 3/2013 | Felt | H04W 4/22 348/158 |
| 2013/0226965 A1* | 8/2013 | Fukui | G06F 17/30528 707/770 |
| 2014/0280121 A1* | 9/2014 | Sharp | G06F 17/3053 707/732 |
| 2014/0280185 A1* | 9/2014 | Nordstrom | G06F 17/30321 707/741 |
| 2015/0026187 A1* | 1/2015 | Ballou | G06F 17/30321 707/741 |
| 2015/0051981 A1* | 2/2015 | Ge | G06Q 30/0269 705/14.66 |
| 2015/0370758 A1* | 12/2015 | Bank | G06F 17/212 715/229 |
| 2016/0057150 A1* | 2/2016 | Choi | H04L 63/102 726/1 |
| 2016/0162938 A1* | 6/2016 | LeBeau | G06Q 30/0255 705/14.53 |
| 2016/0350812 A1* | 12/2016 | Priness | G06Q 30/0269 |

* cited by examiner

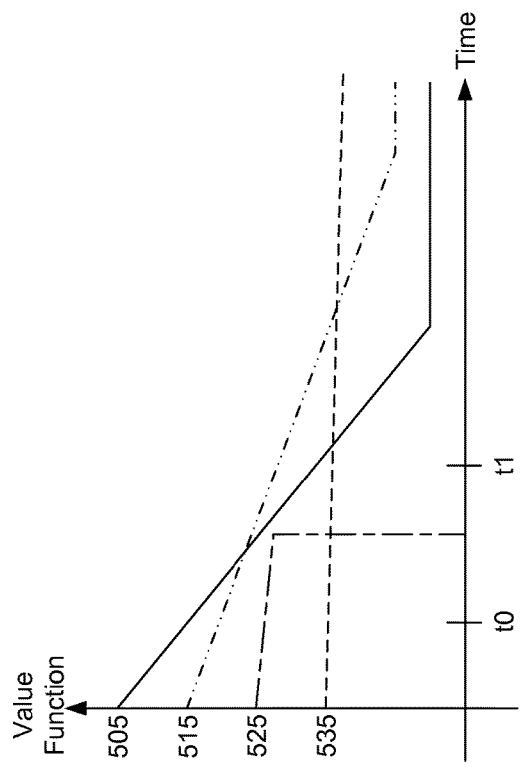
FIG. 5A
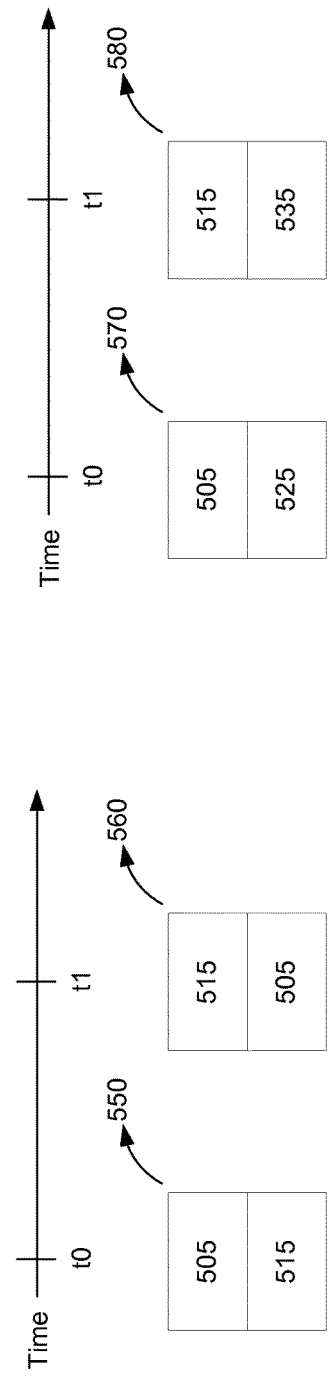
FIG. 5B
FIG. 5C

PRESENTING CONTENT TO A SOCIAL NETWORKING SYSTEM USER BASED ON CURRENT RELEVANCE AND FUTURE RELEVANCE OF THE CONTENT TO THE USER

BACKGROUND

This disclosure relates generally to selecting content for presentation to a social networking system user, and more particularly to accounting for relevance of content to a social networking system user at a current time and at one or more future times when selecting content.

A social networking system allows users to connect to and to communicate with other users of the social networking system. Users create profiles on a social networking system that are tied to their identities and include information about the users, such as interests and demographic information. The social networking system selects and presents content to a user to encourage the user to interact with the social networking system and with other users of the social networking system. For example, the social networking system generates a feed of content items for presentation to a user that includes content items describing actions performed by other users of the social networking system or content provided to the social networking system by other users of the social networking system.

When selecting content for presentation to a user, conventional social networking systems determine measures of relevance between various content items and the user. The measure of relevance between a user and a content item is typically based at least in part on the user's likelihood of interacting with the content item when the content item is presented. However, some content items may become irrelevant to a user at a certain time. Selecting content items based solely on their current relevance to a user may prevent a conventional social networking system from presenting certain content items to the user before a time when the content items are irrelevant to a user, which may reduce an amount of interaction between the user and the social networking system.

SUMMARY

A social networking system selects and presents content items to its users. For example, the social networking system selects content items and presents a feed including the selected content items to the user. When selecting content items for presentation to a user, the social networking system determines measures of relevance between various content items and the user and selects content items for presentation to the user based on the measures of relevance. Different content items may have different measures of relevance to the user. A content item may be associated with a value function that represents a measure of relevance between the content item and the user at different points in time, so the value function represents changes in the measure of relevance of the content item to the user over time. For example, a content item is associated with a value function that decays over time and reaches zero at a certain time, indicating the content item is no longer relevant to the user after the certain time. For example, scores from a sporting event may be irrelevant to a user after a certain time interval following the conclusion of the sporting event. When selecting content for presentation to the user, the social networking system accounts for value functions associated with various content items (which may have different value functions), allowing the social networking system to account for changes in measures of relevance of various content items to the user over time.

To select content for presentation to a user via a feed at a current time, the social networking system identifies candidate content items for presentation to the user. Candidate content items are content items eligible to be presented to the user, such as content items having certain characteristics or having at least a threshold number of targeting criteria satisfied by characteristics of the user. The social networking system obtains a value function associated with different candidate content items. In one embodiment, the social networking system obtains a value function associated with each candidate content item. The social networking system obtains a value function for various candidate content items (e.g., each candidate content item); the value function for a candidate content item represents a measure of relevance between the user and the candidate content item at different times.

Based on the value functions for various candidate content items, the social networking system determines an expected amount of interaction by the user with the feed at the current time for various combinations of the candidate content items in the feed at the current times. As the likelihood of the user interacting with various candidate content items may vary depending on the positions of candidate content items in the feed relative to each other, the social networking system determines expected amounts of user interaction with various combinations of candidate content items in the feed presented at the current time. For example, the social networking system determines an expected amount of user interaction with each combination of candidate content items in the feed for presentation at the current time, allowing the social networking system to determine differences in user interaction with the feed for presentation at the current time when candidate content items are presented in different locations in the feed relative to each other. The social networking system determines an expected amount of user interaction with a combination of candidate content items in the feed for presentation at the current time by aggregating measures of relevance between the user and candidate content items included in the combination based on the value functions for the candidate content items included in the combination. In some embodiments, the social networking system applies position discounts to the value functions for the candidate content items based on the positions of the candidate content items relative to each other, or relative to a reference position, in the feed for presentation at the current time and aggregates the value functions for the candidate content items in the combination of candidate content items at the current time after application of the position discounts to determine the expected amount of user interaction with the feed for presentation at the current time and including the combination of candidate of candidate content items.

Additionally, for the various combinations of candidate content items, the social networking system determines predicted amounts of user interaction with one or more additional feeds for presentation to the user at one or more additional times that are subsequent to the current time based on combinations of candidate content items included in the feed of content items at the current time. The social networking system determines a predicted amount of user interaction with an additional feed for presentation at an additional time at least in part on an aggregation of measures of relevance for candidate content items in a combination of candidate content items included in the additional feed at the additional time based at least in part on the value functions of the candidate content items in the combination included in the additional feed at the additional time. In some embodiments, the social networking system applies position discounts to the value functions at the additional time for the candidate content items in the additional feed based on the positions of the candidate content items relative to each other in the combination, or relative to the reference position, in the additional feed presented at the additional time and aggregates the value functions for the candidate content items in the combination of candidate content items at the additional time after application of the position discounts to determine the predicted amount of user interaction with the additional feed for presentation at the additional time when the combination of candidate content items is included in the additional feed. Because the value functions for various candidate content items identify measures of relevance between the candidate content items at different points in time, the social networking system determines the values of the value function at the additional time and aggregates the values of the value function at the additional time for candidate content items in a combination to predict the amount of user interaction with the candidate content items in a combination at the additional time.

To generate the feed of candidate content items for presentation at the current time, the social networking system selects a combination of candidate content items that maximizes an aggregation of the expected amount of user interaction with the feed for presentation at the current time and one or more predicted amounts of user interaction with one or more additional feeds for presentation at one or more additional times subsequent to the current time. For example, the social networking system selects a combination of candidate content items in positions relative to each other or relative to the reference position that maximizes the aggregate of the expected amount of user interaction with the current feed and the predicted amounts of user interaction with the one or more additional feeds. In some embodiments, maximizing the aggregation of the expected amount of user interaction with the feed for presentation at the current time and predicted amounts of user interaction with the one or more additional feeds cause the social networking system to include a candidate content item in the feed for presentation to the current time having a lower measure of relevance to the user at the current time than an additional candidate content item having a higher measure of relevance to the user at the current time because the value function of the candidate content item decreases at a faster rate than the value function of the additional candidate content item.

By selecting a combination of candidate content items for the feed for presentation at the current time based on expected user interaction with the feed for presentation at the current time as well as predicted user interaction with one or more additional feeds presented at later times, the social networking system increases an overall amount of user interaction with content presented by the social networking system over time, providing the social networking system with more information about various users. In this way, the social networking system can optimize the feed over time, rather than just at a current instant, by considering future opportunities to present content items in the feed. For example, given a limited space in a feed, the social networking system may place a first content item into the feed even though it has a lower present value than a second content item, where the second content item's value function decays more slowly than that of the first content item, thereby reserving the second content item for selection into the feed at a later time when its value is still relatively high.

BRIEF DESCRIPTION OF THE DRAWINGS

FIG. 5A is an example of value functions of content items identifying measures of relevance between a user and the content items over time, in accordance with an embodiment.

FIG. 5B illustrates an example organization of content items of FIG. 5A based on current measures of relevance between the user and the content items, in accordance with an embodiment.

FIG. 5C illustrates an example organization of content items of FIG. 5A based on current and future measures of relevance between the user and the content items, in accordance with an embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Architecture

Figure 1:
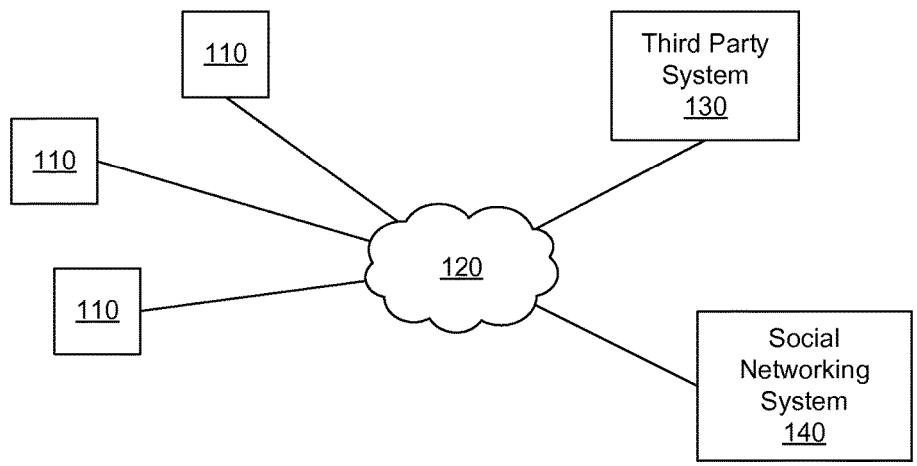
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to other online systems presenting content to users that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
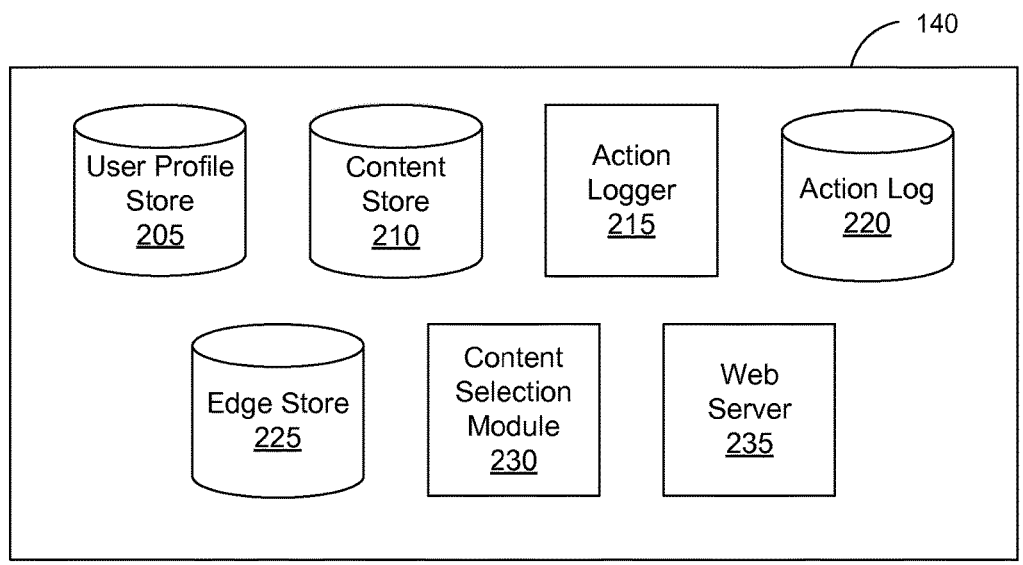
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a content selection module 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged or stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user (also referred to herein as "candidate content items") in one or more selection processes, which identify a set of content items for presentation to the user. For example, the content selection module 230 determines measures of relevance of various content items to the user based on characteristics associated with the user by the social networking system 140 and based on the user's affinity for different content items. In some embodiments, the content selection module 230 obtains or determines a value function associated with various candidate content items, where a value function associated with a candidate content item represents a measure of affinity of the user for the candidate content item over time. Value functions associated with content items are further described below in conjunction with FIGS. 4-5C.

Based on the measures of relevance, the content selection module 230 selects content items for presentation to the user. For example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include advertisement requests ("ad requests") or other content items associated with bid amounts. A bid amount associated with a content item specifies an amount of compensation the social networking system 140 receives from a user associated with the content item in exchange for presenting the content item to other users or for the social networking system 140 receiving a specific interaction with the content item from another user presented with the content item. The content selection module 230 uses the bid amounts associated with ad requests when selecting content for presentation to the user. In various embodiments, the content selection module 230 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting an ad request or a content item. For example, the expected value associated with an ad request is a product of the ad request's bid amount and a likelihood of the user interacting with the ad content from the ad request. The content selection module 230 may rank ad requests, or other content items, based on their associated bid amounts and select ad requests, or other content items, having at least a threshold position in the ranking for presentation to the user. In some embodiments, the content selection module 230 ranks both content items not associated with bid amounts and ad requests (or other content items associated with bid amounts) in a unified ranking based on bid amounts associated with ad requests and measures of relevance associated with content items and ad requests. Based on the unified ranking, the content selection module 230 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 230 receives a request to present a feed of content items to a user of the social networking system 140. The feed of content items may include one or more ad requests as well as content items, such as stories describing actions associated with other social networking system users connected to the user. The content selection module 230 accesses one or more of the user profile store 205, the content store 210, the action log 220, and the edge store 225 to retrieve information about the user. For example, information describing actions performed by users connected to the user or other data associated with users connected to the user are retrieved. Additionally, one or more ad requests may be retrieved from the content store 210 or from another source. The retrieved content items and ad requests are analyzed by the content selection module 230 to identify candidate content items, including ad requests, eligible for presentation to the user. For example, content items associated with users who are not connected to the user or stories associated with users for whom the user has less than a threshold affinity are discarded as candidate content items. Based on various criteria, the content selection module 230 selects one or more of the candidate content items or ad requests for presentation to the identified user via one or more selection processes. The selected candidate content items or ad requests are included in a feed of content that is presented to the user. In some embodiments, the content selection module 230 applies one or more policies regulating the content items included in the feed of content items. For example, the feed of content items includes at least a threshold number of content items describing actions associated with users connected to the user via the social networking system 140.

In various embodiments, the content selection module 230 selects candidate content items for inclusion in a feed to be presented to a user at a current time based on measures of relevance of the candidate content items to the user at the current time and measures of relevance of the candidate content items at one or more times subsequent to the current time. For example, the content selection module 230 determines a measure of relevance between a user and a candidate content item from the value function associated with the candidate content item and also determines measures of relevance between the user and the candidate content item at one or more times subsequent to the current time from the value function associated with the candidate content item. In some embodiments, the content selection module 230 determines an expected amount of user interaction with various combinations of candidate content items at the current time based on the measures of relevance between the user and the candidate content items at the current time and also predicts an amount of user interaction with the combinations of candidate content items at one or more times subsequent to the current time. To select candidate content items for inclusion in the feed for presentation at the current time, the content selection module maximizes an aggregation of the expected amount of user interaction with a combination of candidate content items at the current time and the predicted amount of user interaction with the combination of candidate content items, as further described below in conjunction with FIGS. 4-5C. The combination of candidate content items determines the positions of the candidate content items in the feed for presentation at the current time relative to each other or relative to a reference position of the feed; for example, the combination of candidate content items identifies an order of the candidate content items in the feed for presentation at the current time based on likelihoods of the user interacting with various candidate content items.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOSO, ANDROID™, WEBOS® or BlackberryOS.

Example Presentation of a Feed of Content Items

Figure 3:
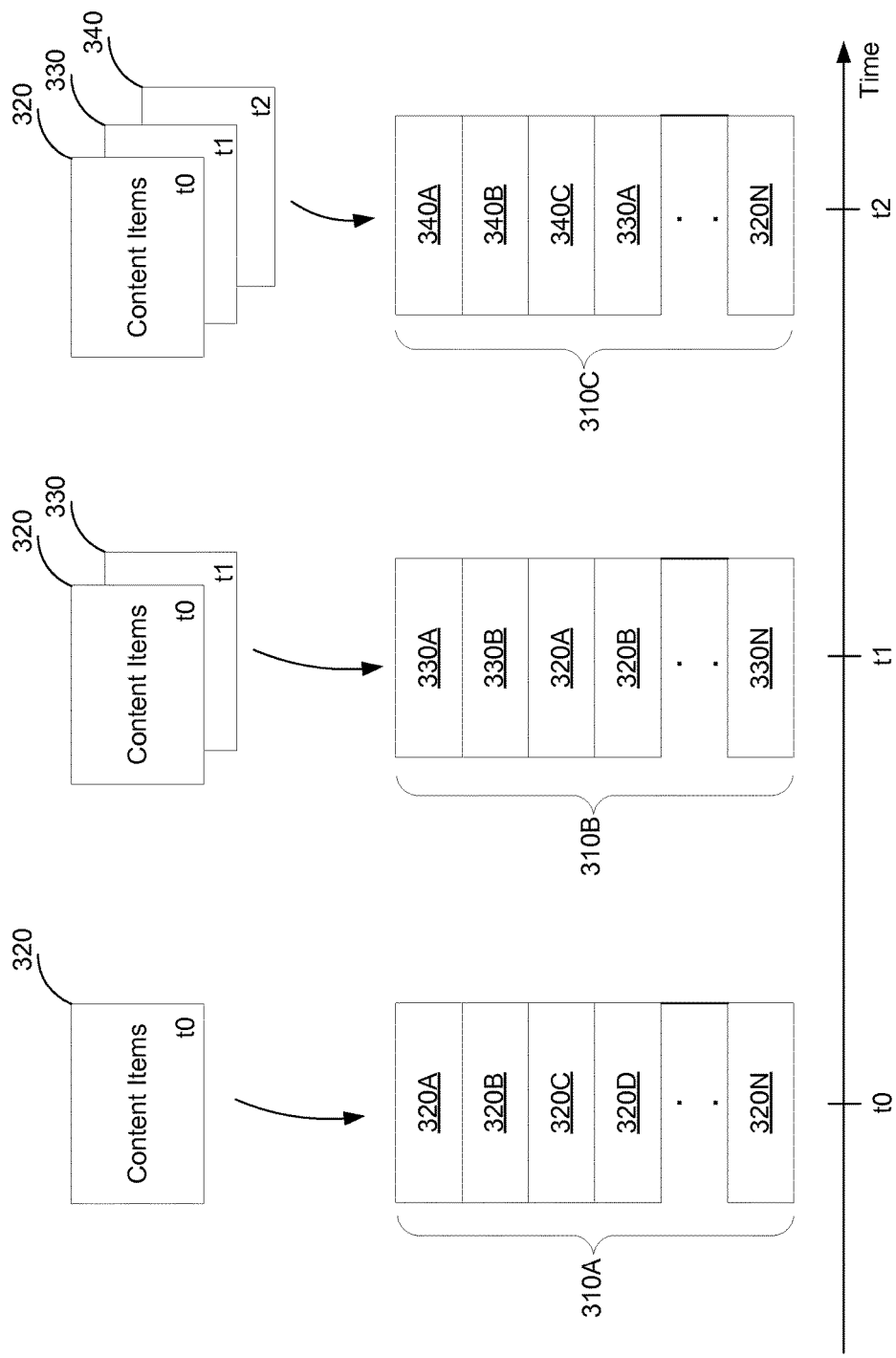
FIG. 3 is an example feed of content items presented to a user of a social networking system at different times, in accordance with an embodiment.

FIG. 3 is a block diagram of an example feed of content items presented by a social networking system 140 to a user at different times. In FIG. 3, the horizontal axis represents time, so a feed of content items presented at a location along the horizontal axis indicates the feed of content items at a time corresponding to the location. For purposes of illustration, FIG. 3 shows a current time denoted at t0 and times subsequent to the current time denoted by t1 and t2. Hence, FIG. 3 shows a feed of content items 310A at the specific time, t0, a feed of content items 310B at a time, t1, subsequent to the current time, as well as a feed of content items 310C at another time, t2, subsequent to the current time.

The feed of content items 310A at the current time includes a plurality of content items 320A-320N selected from a set of content items 320 maintained by the social networking system 140 at the current time. In various embodiments, the set of content items 320 is maintained in the content store 210 or is retrieved from one or more sources by the social networking system 140. Various content items 320A-320N in the set of content items 320 are associated with a value function. As described above in conjunction with FIG. 2, a value function associated with a content item 320 specifies a measure of relevance between the content item 320 and the user at different times. The value function associated with a content item 320 may be determined by the social networking system 140 based on characteristics of the user and characteristics of the content item 320 or may be associated with the content item 320 by a user who provided the content item 320 to the social networking system 140. The value function associated with the content item 320 may vary over time (increase, decrease, or increasing for some time and decreasing for some other time) indicating changes in the measure of relevance between the content item 320 and the user over time. For example, the value function indicates the measure of relevance between the user and the content item 320 reaches zero at a specific time, indicating the content item 320 is not relevant to the user at the specific time. As a specific example, a content item 320 associated with scores of a live basketball game is associated with a value function that rapidly decays during a time interval after the completion of the basketball game, indicating the content item 320 becomes less relevant to the user as the time interval lapses. The rate at which the value function associated with the content item 320 in the preceding example decays may be determined based on information associated with the user by the social networking system 140 (e.g., preferences in the user's user profile, prior actions associated with the user, etc.). In one embodiment, the social networking system 140 obtains a value function associated with each content item 320A-320N from the set of content items 320 eligible for presentation to the user at the current time when generating the feed of content items 310A for presentation at the current time.

In one embodiment, value functions associated with a content item 320A and with an additional content item 320B change at different rates over time, indicating the measures of relevance between the user and the content item 320A and between the user and the additional content item 320B change differently over time. For example, the user specifies a preference that the user is interested in a basketball game score until 48 hours after the basketball game ends and also specifies a preference that the user is interested in a baseball game score until 24 hours after the baseball game ends. In this example, a value function for a content item 320 associated with a baseball game decays more rapidly than a value function for a content item 320 associated with a basketball game (i.e., the value function for the content item 320 associated with the baseball game decays to less than a threshold measure of relevance within 24 hours after the baseball game ends, while the value function for the content item 320 associated with the basketball game decays to less than the threshold measure during 48 hours after the basketball game ends). Value functions associated with content items 320 are further described below in conjunction with FIG. 5A.

Figure 4:
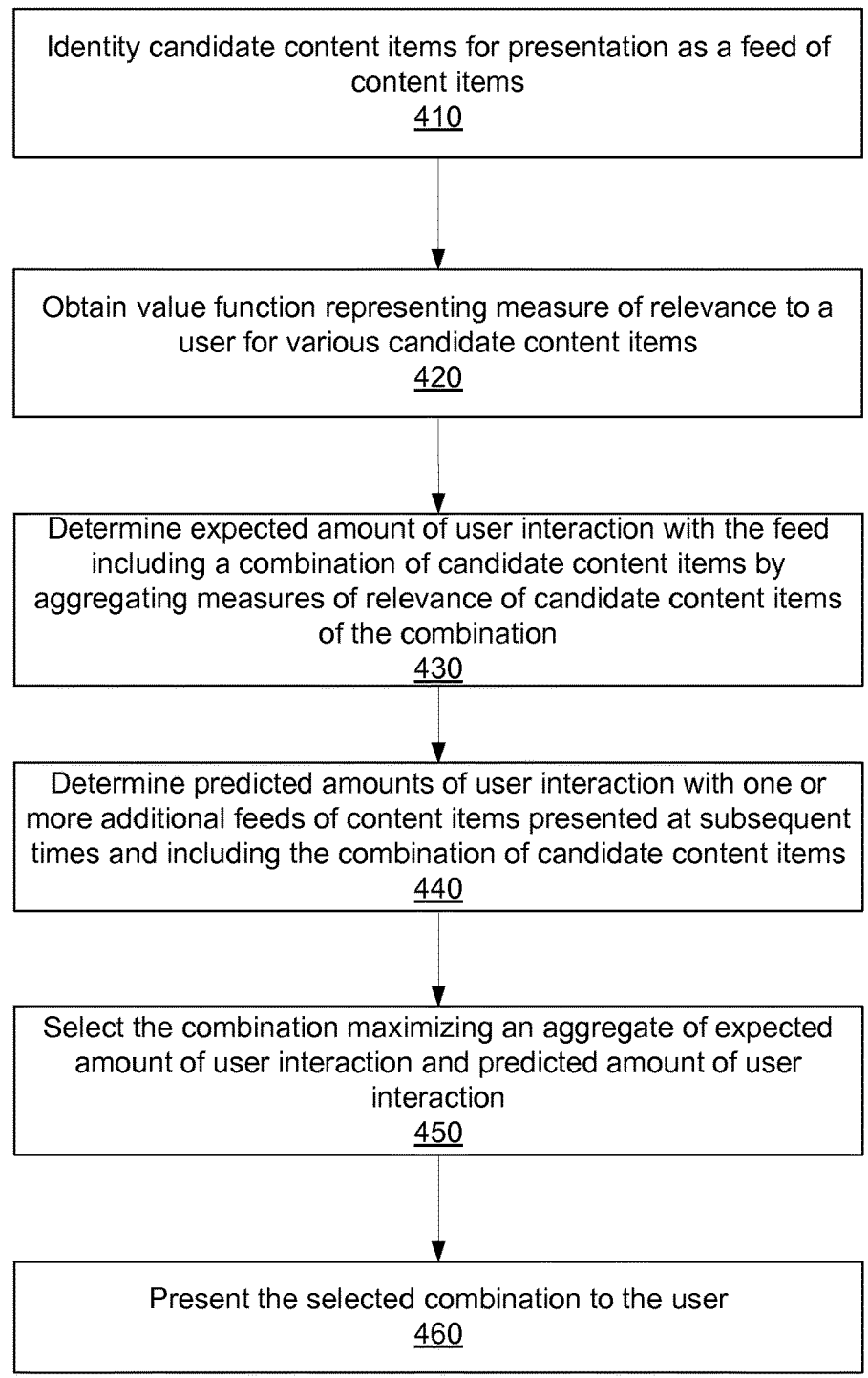
FIG. 4 is a flowchart of a process for organizing a feed of content items of a social networking system based on current and future relevance, in accordance with an embodiment.

When generating the feed of content items 310A for presentation at the current time, the social networking system 140 selects content items 320A-320N from the set of content items 320 maintained by the social networking system 140 at the current time (i.e., content items 320 the user has obtained or can obtain at the current time) accounts for current measures of relevance between content items 320 from the set as well as measures of relevance between the content items 320 from the set at one or more times subsequent to the current time, as further described below in conjunction with FIG. 4. Over time, the social networking system 140 obtains additional content items eligible for presentation to the user via a feed of content items. For example, as users connected to the user via the social networking system 140 perform actions between the current time and a subsequent time, t1, or the social networking system 140 receives additional content items, the social networking system 140 maintains another set of content items 330 as well as the set of content items 320 maintained at the current time. At the subsequent time, t1, the social networking system 140 generates a feed of content items 310B including the content items 320A-320N included in the feed of content items 310A presented at the current time as well as content items 330A, 330B from the set of content items 330 maintained at the subsequent time. Hence, the feed of content items 310B presented at the subsequent time presents the content items 320A-320N from the set of content items 320 in different locations than the feed of content items 310A presented at the current times. For example, the content items 320A-320N are presented in lower positions than the content items 330A, 330B from the set of content items 330 in the feed of content 310B presented at the subsequent time. Similarly, actions by additional users connected to the user and content received by the social networking system 140 between the subsequent time, t1, and an additional time after the subsequent time, t2, provide another set of content items 340 for inclusion in a feed of content items 310C presented at the additional time. Hence, the feed of content items 310C presented at the additional time includes continent items 340A-340C from the other set of content items 340 in addition to the content items 330A, 330B from the set of content items 330 and the content items 320A-320N from the set of content items 320. Hence, at different times, the social networking system 140 generates a feed of content items for presentation to a user based on the content items maintained by the social networking system 140 and eligible for presentation to the user at the different times.

Selecting Content Items for Presenting to a User

FIG. 4 is a flowchart of one embodiment of a process for generating feed of content items of a social networking system 140 based on measures of relevance between the user and the content items at a current time and between the user and the content items at one or more times subsequent to the current time. In some embodiments, the process may include different or additional steps than those described in conjunction with FIG. 4. Additionally, in some embodiments, the steps of the method may be performed in different orders than the order described in conjunction with FIG. 4.

The social networking system 140 receives a request to present a feed of content items to a user of the social networking system 140 at a specific time. For example, the social networking system 140 receives a request to present the feed of content items to the user at a current time. After receiving the request, the social networking system 140 identifies 410 content items eligible for presentation to the user at the specific time, also referred to as "candidate content items." For example, candidate content items are content items having at least a threshold number of targeting criteria satisfied the characteristics of the user, content items without targeting criteria, or content items having one or more specified characteristics (e.g., content items associated with users or objects connected to the user via the social networking system 140). The candidate content items are identified 410 from content items accessible to or maintained by the social networking system 140 at the specified time (e.g., at the current time).

For various candidate content items, the social networking system 140 obtains 420 a value function associated with a candidate content item representing a measure of relevance between the user and the candidate content item at various times. In one embodiment, the social networking system 140 obtains 420 a value function associated with each candidate content item. A value function for a candidate content item may be associated with the candidate content item by a user providing the candidate content item to the social networking system 140. For example, a user who provided a candidate content item to the social networking system (e.g., posted a video file to the social networking system 140) specifies a value function for the candidate content item that varies over time as specified by the user who provided the candidate content item. Alternatively, the social networking system 140 determines a value function for the candidate content item based at least in part on the characteristics of the candidate content item and characteristics of the user to whom the candidate content item is to be presented. For example, the social networking system 140 receives a candidate content item (e.g., a photo) from a user and determines a value function of the candidate content item for the user to whom the candidate content item is to be presented based on characteristics of the candidate content item and characteristics of the user to whom the candidate content item is to be presented. In one embodiment, a characteristic of a candidate content item is an expiration time that specifies a time at which a value function for the candidate content item is less than a threshold value (e.g., a time at which the measure of relevance between the candidate content item and the user is zero). Hence, the expiration time of the candidate content item identifies a time after which the user has less than a threshold likelihood of interacting with the candidate content item.

As described above in conjunction with FIG. 2, a value function for a candidate content item may change over time, so the value function indicates changes in the measure of relevance between the user and the candidate content item over time, indicating changes in the likelihood of the user interacting with the candidate content item. For example, the value function for a comment posted by a user increase and/or decreases over time (e.g., increases for a time period and decreases for another time period) with time, indicating that the measure of relevance between the user and the comment varies over time based on the value function. Value functions for different candidate content items vary at different rates. For example, the value function of a candidate content item varies over time at a particular rate while the value function of an additional candidate content item varies over time at an alternative rate that differs from the particular rate.

In one embodiment, the value function of a candidate content item is based on characteristics of the candidate content item and prior interactions by the user with additional content items having at least a threshold number of characteristics matching, or similar to, characteristics of the candidate content item. For example, a candidate content item associated with a basketball game has a value function determined by the social networking system 140 based on prior interactions by the user with other content items associated with basketball games. The social networking system 140 retrieves stored interactions by the user with content items, such as content items having one or more characteristics matching the characteristics of the candidate content item, and determines the value function of the candidate content item based on the stored interactions. For example, the social networking system 140 associates different values with different types of interactions with content item (e.g., a value of one for expressing a preference for a content item, a value of three for commenting on the content item, and a value of five for sharing the content item with another user). The social networking system 140 may combine values for different types of interactions performed by the user with content items having at least a threshold number of characteristics matching the characteristics of the candidate content items at different times after the user was presented with the content item having at least the threshold number of characteristics matching the characteristics of the candidate content item to determine the value function for the candidate content item. For example, the social networking system 140 determines a combination of values for different types of interactions performed by the user with each content item having at least the threshold number of characteristics matching the characteristics of the candidate content item at different times subsequent to presentation of a content item having at least the threshold number of characteristics matching the characteristics of the candidate content item. In some embodiments, the social networking system 140 differently weights values for interactions with different content items based on characteristics of the content items when determining a value function for a candidate content item.

In one embodiment, the value function of a candidate content item reaches zero at a time subsequent to the current time, indicating the candidate content item is not relevant to the user. Alternatively, when the value function of the candidate content has less than a threshold value, indicating the candidate content item is not relevant to the user. For example, a value function of a candidate content item of a comment posted by an additional user reaches zero at a time subsequent to the current time to indicate the comment is not relevant to the user at the time subsequent to the current time. In one embodiment, the time at which the value function of the candidate content item is less than the threshold value or zero is specified by a user providing the candidate content item to the social networking system 140. In the preceding example, the user posting the comment to the social networking system 140 specifies the time at which the value function for the candidate content item has less than the threshold value or has a value of zero. Alternatively, the social networking system 140 determines a time at which the value function of the candidate content item reaches zero based on characteristics of the candidate content item and prior interactions by the user with content items having at least a threshold number of characteristics matching the characteristics of the candidate content item. For example, if the candidate content item is a live score of a basketball game, based on prior interactions by the user with other content items that are live scores of basketball games, the social networking system 140 determines a time when the user has less than a threshold likelihood of interacting with content items that are live scores of basketball games, which is identified by the social networking system 140 as the time when the value function of the candidate content item has less than a threshold measure of relevance to the user.

After obtaining value functions for various candidate content items (e.g., obtaining 420 a value function for each candidate content item, obtaining 420 a value function for candidate content items having one or more particular characteristics), the social networking system 140 selects a combination of candidate content items to include in the feed of content items for presentation at the specific time.

The combination of candidate content items may specify the positions in the feed of various candidate content items relative to each other or relative to a reference position of the feed in various embodiments. In one embodiment, the social networking system 140 determines an amount of user interaction for each possible combination of the candidate content items. For example, if the feed of content items for presentation to the user at the specific time includes two content items and there are four candidate content items for presentation, the social networking system determines 430 an expected amount of interaction by the user with the feed of content items for presentation at the specific time for each of the six possible combinations of the candidate content items capable of being included in the feed of content items for presentation at the specific time.

To determine 430 an expected amount of user interaction with the feed for presentation at the specific time including a combination of candidate content items, the social networking system 140 determines an expected amount of user interaction with each candidate content item in the combination based on the measures of relevance of each of the candidate content items to the user at the specific time based on the value functions of each of the candidate content items at the specific time. The social networking system 140 aggregates the measures of relevance for each of the candidate content items in the combination to determine 430 the expected amount of user interaction with the feed including the combination of candidate content items. In some embodiments, the social networking system 140 accounts for decreases in user interaction with additional candidate content items presented in lower positions in the feed than a candidate content item when determining 430 the expected amount of interaction with the feed including the combination of candidate content items. To account for the decrease in value from presenting the additional candidate content items in positions below the position in which the candidate content item is presented, the social networking system 140 applies position discounts to the measures of relevance of the candidate content items in the combination corresponding to positions in the feed of content items in which of the presenting the candidate content items in the candidate content items are presented in the combination. A position discount value is associated with a position in the feed and reflects a predicted decrease in user interaction with a candidate content item based on the position of the content in the feed. When a feed of content items is presented to a user, the likelihood of a user interacting with a content item presented via the feed varies depending on the position in the feed in which the content item is presented. Positions of content items within the feed of content items may be determined based on a distance between the content item and a reference position, such as an upper boundary of the feed of content items. For example, a user has a higher likelihood of interacting with content items presented in positions within a threshold distance from an upper boundary (or "top") of the feed of content items than of interacting with content items presented in positions greater than the threshold distance from the upper boundary of the feed of content items. The position discount value applied to a measure of relevance of a candidate content item in the combination may be based at least in part on a distance between the content item and a reference position in the feed of candidate content items, such as the upper boundary of the feed of content items. For example, different position discounts are associated with different distances between a candidate content item and the upper boundary of the feed of content items, so a distance between the candidate content item and the upper boundary determines the position discount applied to a measure of relevance of the candidate content item to the user. Determining a position discount value associated with a position in a feed of content items is further described in U.S. patent application Ser. No. 14/049,429, filed on Oct. 9, 2013, and in U.S. patent application Ser. No. 14/675,009, filed on Mar. 31, 2015, which are each hereby incorporated by reference in their entirety. Hence, in some embodiments, the expected amount of user interaction with a feed of content items including the combination of candidate content items is an aggregation of the measures of relevance of each candidate content item in the combination modified by position discounts associated with positions in the feed of candidate content items for presentation at the specific time in which the candidate content items are presented.

Additionally, the social networking system 140 determines 440 predicted amounts of user interaction with one or more additional feeds of content items for presentation to the user at one or more additional times subsequent to the specified time that include a combination of candidate content items. In one embodiment, the social networking system 140 determines 440 predicted amounts of user interactions with the one or more additional feeds for presentation to the user at the one or more additional times that include each combination of candidate content items. To determine 440 a predicted amount of user interaction with an additional feed of content items including a combination of candidate content items for presentation at a time subsequent to the specified time, the social networking system 140 determines measures of relevance of each candidate content item at the time subsequent to the specified time from the value functions associated with each candidate content item; the social networking system 140 then aggregates the measures of relevance of each candidate content item in the combination to determine 440 the predicted amount of user interaction with the additional feed for presentation at the time subsequent to the current time. In some embodiments, the social networking system 140 applies a position discount to the measures of relevance of each candidate content item in the combination at the time subsequent to the current item based on the positions in the additional feed in which each candidate content item is presented, as described above. After application of the position discounts, the measures of relevance of each candidate content item in the combination at the time subsequent to the current time are aggregated to determine 440 the predicted amount of user interaction with the additional feed including the combination of candidate content items.

In some embodiments, the social networking system 140 modifies the position discounts applied to the measures of relevance of the candidate items at the time subsequent to the specific time relative to the position discounts applied to the measures of relevance of the measures of relevance of the candidate content items at the specific time to account for displacement of the candidate content items from inclusion of additional content items in the additional feed of content items for presentation at the time subsequent to the specific time. For example, the additional feed of content items includes content items obtained by the social networking system 140 between the specific time and the time subsequent to the specific time in positions of the feed of content items that displace the candidate content items to lower positions relative to a reference position in the additional feed of candidate content items. To account for decreases in user interaction with candidate content items in an additional feed, the social networking system 140 may determine a time difference between the specific time and the additional time subsequent to the specific time and determine an average difference in a number of content items presented to the user in prior content feeds temporally separated by the time difference based on content previously presented to the user by the social networking system 140. The average difference may account for a time of day associated with the specific time and the additional time; for example, if the specific time is 11:00 AM and the subsequent time is 11:05 AM, the average difference in the number of content items is based on the number of content items in feeds of content items presented to the user at 11:00 AM and at 11:05 AM on various days. In some embodiments, the social networking system 140 decreases the positions in the additional feed of the candidate content items by the average difference in the number of content items, causing application of position discounts associated with the decreased positions to the measures of user interaction with the candidate content items at the additional time. Alternatively, the social networking system 140 decreases positions of certain candidate content items in the additional feed based on the average difference in the number of content items and measures of relevance of the candidate content items at the additional time. For example, the social networking system 140 decreases positions in the additional feed of content items having less than a threshold measure of relevance at the additional time by a number of positions determined based at least in part on the threshold measure of relevance and the average difference in the number of content items; hence, candidate content items with greater than the threshold measure of relevance at the additional time remain in the same position in the feed of content items for presentation at the specific time and in the additional feed of content items for presentation at the additional time, while the positions in the additional feed of content items of candidate content items with less than the threshold measure of relevance are decreased relative to their positions in the feed of content items for presentation at the specific time.

The social networking system 140 associates weights with each predicted amount of user interaction with an additional feed including a combination of candidate content items presented at a time subsequent to the current time. As shown in FIG. 3, content items that were not available for presentation at the specific time may be added to the additional feed of content items, the candidate content items in the combination may be displaced from their positions in the feed of content items presented at the specific time into different positions in the additional feed of candidate content items for presentation at the time subsequent to the specific time. This displacement may reduce the likelihood of the user interacting with the candidate content items in the combination. To account for potential reduction in user interaction with candidate content items in the combination when presented in the additional feed, the social networking system 140 may associate a weight with the predicted amount of user interaction with the additional feed including the combination of candidate content items. The weight associated with a predicted amount of user interaction with the additional feed may be based at least in part on a difference between the specific time and the time subsequent to the specific time. For example, the weight associated with a predicted amount of user interaction with the additional feed including the combination of candidate content item may represent a measure of confidence in the predicted amount of user interaction with the combination of candidate content item. A greater difference between the specific time and the time subsequent to the specific time increases the likelihood of the candidate content items in the combination being displaced by additional content items in the additional feed of content items, which decreases the measure of confidence in the predicted amount of user interaction with the additional feed including the combination of candidate content items, so lower weights are associated with predicted amounts of user interaction with additional feeds of content items for presentation at times a greater length of time subsequent to the specific time. For example, weights associated with additional feeds decrease as the difference between the times subsequent to the specific time and the specific time increase.

Based on the expected amount of user interaction with the feeds of content items for presentation at the specific time that include different combinations of candidate content items and the predicted amount of user interaction with one or more additional feeds for presentation at times subsequent to the specific time that include different combinations of candidate content items, the social networking system 140 selects 450 a combination of candidate content items for presentation at the specific time. To select 450 the combination of candidate content items, the social networking system 140 maximizes an aggregate of the expected amount of user interaction with the feed of content items at the specific time (i.e., a current time) and predicted amounts of user interaction with the one or more additional feeds of content items for presentation to the user at one or more additional times subsequent to the current time. The social networking system 140 selects 450 a combination of candidate content items maximizing an aggregation of the expected amount of user interaction with the feed of content items for presentation at the specific time that includes the combination and the predicted amounts of user interaction with one or more additional feeds of content items for presentation to the user at the one or more additional times that include the combination. In one embodiment, for each combination of candidate content items, the social networking system 140 determines a sum of the expected amount of user interaction with the feed of content items for presentation at the specific time that includes the combination and the predicted amounts of user interaction with one or more additional feeds of content items for presentation to the user at the one or more additional times that include the combination and selects 450 the combination of candidate content items associated with the maximum sum. The social networking system 140 may apply weights associated with additional feeds presented at times subsequent to the specific time to the predicted amounts of user interaction with the additional feeds and sum the expected amount of user interaction with the feed for presentation at the specific time with the weighted predicted amounts of user interaction with the additional feed and select 450 the combination of candidate content items associated with a maximum sum.

In one embodiment, the social networking system 140 selects a combination of candidate content items for inclusion in the feed of content items for presentation at the specific time based at least in part on a frequency with which the user accesses content provided by the social networking system 140, such as a frequency with which the user accesses the feed of content items provided by the social networking system. To determine the frequency with which the user access the feed of content items, the social networking system 140 retrieves information identifying prior requests to access the feed of candidate content items and time associated with the prior requests associated with the user by the social networking system 140. When one or more candidate content items have value functions that decay to less than a threshold measure of relevance over time, the social networking system 140 determines a likelihood of the user accessing the feed of content items between the current time and a time when a value function of a candidate content item is less than the threshold measure of relevance. If the determined likelihood is less than a threshold likelihood, the social networking system 140 may identify combinations of candidate content items including the candidate content item and select 450 a combination of candidate content items from the combination of candidate content items including the candidate content items as described above. This increases the likelihood of the user being presented with the candidate content item before the measure of relevance of the candidate content item to the user is less than the threshold value.

Alternatively, the social networking system 140 compares the frequency with which the user determines whether the user accesses the feed of content items provided by the social networking system 140 to a threshold frequency. If the frequency is less than the threshold value, the social networking system 140 identifies combinations of candidate content items including one or more candidate content items that decay to less than a threshold measure of relevance within a time interval associated with the threshold frequency from the specific time and selects 450 a combination of candidate content items from the identified combinations as described above. This allows the social networking system 140 to include candidate content items in the feed of content for presentation at the current time having value functions decaying to less than the threshold measure of relevance before the user is likely to again access the feed of content items. Alternatively, if the frequency equals or exceeds the threshold frequency, the social networking system 140 does not limit selection 450 of a combination of candidate content items to a combination including one or more candidate content items that decay to less than a threshold measure of relevance within a time interval.

The threshold frequency may be selected using a rule-based model or a machine learning model. If the rule-based model is used, the social networking system 140 applies one or more rules to interactions associated with the user to determine the threshold frequency; for example, the rules associate different threshold frequencies with different ranges of accessing the feed provided by the social networking system 140 during different time intervals. If a machine learning model is applied, a model is presented with a data set of example threshold frequencies and accesses to the feed provided by the social networking system at different times and desired presentations of content items with specific value functions, allowing the model to develop one or more rules for identifying content items with specific value functions to present for different frequencies of accessing the feed of content items.

Accounting for both the expected amount of user interaction with the feed of content items for presentation at the specific time and the predicted amount of user interaction with the one or more additional feeds of content items for presentation at the one or more times subsequent to the specific time allows the social networking system 140 to maximize interaction with content feeds provided by the social networking system 140 over time. For example, the social networking system 140 selects a combination of candidate content items having a lower expected amount of user interaction with the feed of content items for presentation at the specific time than other combinations of candidate content items, but having higher predicted amounts of user interaction with the one or more additional feeds of content items for presentation at times subsequent to the specific time than the other combinations of candidate content items. This allows the social networking system 140 to include certain candidate content items having value functions that decay more rapidly than value functions of other content items and having value functions with measures of relevancy at the current time lower than measures of relevancy of the other candidate content items at the current time. In contrast, conventional methods for selecting content items would select candidate content items having maximum measures of relevancy at the current time, regardless of how the measures of relevance of the candidate content items decay over time. Hence, selecting 450 the combination of candidate content items based on the expected amount of user interaction with the feed of content items for presentation at the specific time and the predicted amounts of user interaction with the one or more additional feeds of content items for presentation at the additional times allows the social networking system 140 to include candidate content items having lower measures of relevancy at the specific time but having measures of relevancy that more rapidly decay over time than measures of relevancy of other candidate content items in the feed of content items for presentation at the specific time. The social networking system 140 then presents 460 the feed of content items including the selected combination of candidate content items to the user for presentation at the specific time. For example, the social networking system 140 communicates the feed of content items including the selected combination of candidate content items to a client device 110 associated with the user for presentation.

FIG. 5A shows an example of value functions of candidate content items over time. In FIG. 5A, the horizontal axis represents time and the vertical axis represents a measure of relevance of a candidate content item to a user. Additionally, FIG. 5A identifies a specific time, t0, and a time, t1, that is subsequent to the specific time, t0. For purposes of illustration, FIG. 5A shows value functions for four candidate content items, 505, 515, 525, and 535.

As described above in conjunction with FIGS. 2 and 4, value functions of different candidate content items may vary with different rates over time. For example, the rate of decay of the value function for candidate content item 505 differs from the rate of decay of the value function for candidate content item 515. FIG. 5A also shows a value function for candidate content item 525 that decays to zero between the specific time, t0, and the time, t1, subsequent to the specific time, t0; hence, candidate content item 525 is not relevant to the user after the time subsequent to the specific time, t0. FIG. 5B shows an example selection of candidate content items 505, 515, 525, 535 for feeds 550, 560 of content items presented at different times according to a conventional method that only accounts for measures of relevance at times when a feed 550, 560 is to be presented. In the example of FIG. 5B, at the specific time, t0, feed 550 includes candidate content item 505 and candidate content item 515, as the combined measures of relevance of candidate content item 505 and candidate content item 515 at the specific time, t0, has a maximum value based on the value functions shown in FIG. 5A. Similarly, accounting for measures of relevance only at the time, t1, subsequent to the specific time, t0, causes feed 560 to also include candidate content item 515 and candidate content item 505, as the combined measures of values of candidate content item 505 and candidate content item 515 continues to have a maximum value based on the value functions shown in FIG. 5A. Hence, accounting for only measures of relevance of candidate content items at times when feeds are to be presented prevents candidate content item 525 and candidate content item 535 from being included in feed 550 or in feed 560.

FIG. 5C shows an example selection of candidate content items 505, 515, 525, 535 for feeds 570, 580 of content items presented at different times when accounting for measures of relevance of candidate content items 505, 515, 525, 535 at a time when a feed 570, 580 including two content items is to be presented as well as measures of relevance of candidate content items 505, 515, 525, 535 and one or more times after the feed 570, 580 is to be presented. As described above in conjunction with FIG. 4, to generate the feed 570 for presentation at the specific time, t0, the social networking system 140 determines an amount of user interaction for each of the six possible combinations of two candidate content items 505, 515, 525, 535 at the specific time, t0 and also determines a predicted amount of user interaction with the six possible combinations of two candidate content items 505, 515, 525, 535 at the time, t1, subsequent to the current time, t0. The social networking system 140 selects a combination of candidate content items 505, 515, 525, 535 for presentation in the feed 570 for presentation at the specific time, t0, maximizing an aggregation of the expected amount of user interaction for the combination and the predicted amount of user interaction for the combination. Accounting for both expected user interaction at the specific time, t0, and predicted user interaction at the time, t1, subsequent to the specific time, t0, as well as a frequency with which the user accesses feeds provided by the social networking system 140, causes the social networking system 140 to include content item 525 in the feed 570 for presentation at the specific time, t0, as content item 525 has a value function decaying to zero prior to the time, t1, subsequent to the specific time, t0. Similarly, accounting for expected user interaction with combinations of candidate content items 505, 515, 525, 535 at the time, t1, subsequent to the specific time, t0, and predicted user interaction with combinations of content items 505, 515, 525, 535 at another, later, time causes selection of candidate content items 515, 535 for inclusion in the feed 580 for presentation at the time, t1, subsequent to the current time, t0.

As described above, selecting candidate content items for inclusion in a feed based on expected user interaction with the candidate content items at a specific time and predicted user interactions with the candidate content items at one or more later times allows a feed to include a candidate content item currently having a lower measure of relevance than other candidate content items but having a measure of relevance that decays more rapidly than measures of relevance of other candidate content items. For example, in FIG. 5C, candidate content item 525 has a lesser relevance to the user at the specific time, t0, than candidate content item 515; however, candidate content item 525 is included in the feed 570 of content items for presentation at the specific time, t0, so the candidate content item 525 is presented to the user before the measure of relevance of candidate content item 525 indicates the candidate content item 525 is not relevant to the user. In the preceding example, the measure of relevance of candidate content item 535 does not decay to less than a threshold measure of relevance between the specific time, t0, and the time, t1, subsequent to the specific time, t0, so candidate content item 535 is included in the feed 580 of content items for presentation at the time, t1, subsequent to the specific time, t0. This allows the social networking system 140 to include candidate content items in a feed at times when the candidate content items have greater than a threshold measure of relevance to the user, which increases overall user interaction with content provided by the social networking system 140 over time.

Summary

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A computer-implemented method comprising:
identifying current candidate content items available for presentation to a user of a social networking system via a feed of content items at a current time;
obtaining a value function for each current candidate content item, the value function for a candidate content item representing a measure of relevance of the candidate content item at different times;
for each of a plurality of combinations of the current candidate content items available for presentation to the user via the feed at the current time:
determining a predicted amount of user interaction with the combination of the current candidate content items at the current time by aggregating measures of relevance for the current candidate content items included in the combination of the current candidate content items based at least in part on the value functions for each of the current candidate content items included in the combination, and
for each of a plurality of additional times subsequent to the current time:
identifying a plurality of adjusted combinations of candidate content items available for presentation to the user via the feed at the additional time, each adjusted combination of candidate content items based at least in part on the combination of the current candidate content items, and
for each of the plurality of adjusted combinations of candidate content items available for presentation to the user via the feed at the additional time:
determining a predicted amount of user interaction with the adjusted combination of candidate content items by aggregating measures of relevance for the candidate content items included in the adjusted combination of candidate content items based at least in part on the value functions for each of the candidate content items included in the adjusted combination of candidate content items;
selecting a combination of the plurality of combinations of the current candidate content items for inclusion in the feed of content items at the current time, such that the selection maximizes an aggregate of the predicted amount of user interaction with the combination of the current content items at the current time and the predicted amounts of user interaction with each adjusted combination of candidate content items of each plurality of adjusted combinations of candidate content items at each of the plurality of additional times;
presenting, at the current time, the selected combination of the current candidate content items to the user via the feed of content items; and
for each of the plurality of additional times subsequent to the current time:
selecting an adjusted combination of the plurality of adjusted combinations of candidate content items for inclusion in the feed of content items at the additional time, such that the selection maximizes an aggregate of the predicted amount of user interaction with the adjusted combination of candidate content items at the additional time and the predicted amount of user interaction with each adjusted combination of candidate content items for each plurality of adjusted combinations of candidate content items at each additional time of the plurality of additional times that is subsequent to the additional time, by:
determining a frequency with which the user accesses the feed of content items provided by the social networking system is less than a threshold frequency;
responsive to the determining, identifying combinations of the current candidate content items from the plurality of combinations of the current candidate content items for inclusion in the feed of content items at the current time, the identified combinations including at least one current candidate content item having a value function with a measure of relevance less than a threshold within a time interval from the current time, the time interval associated with the threshold frequency; and
selecting a combination from the identified that maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times; and
presenting, at the additional time, the selected adjusted combination of candidate content items to the user via the feed of content items.

2. The computer-implemented method of claim 1, wherein the value function of a current candidate content item varies over time at a rate and the value function of candidate content item included in an adjusted combination of candidate content items that is not a current candidate content item varies over time at an additional rate that differs from the rate.

3. The computer-implemented method of claim 1, wherein obtaining the value function comprises retrieving the value function associated with a candidate content item, the value function specified by a user providing the candidate content item to the social networking system.

4. The computer-implemented method of claim 1, wherein obtaining the value function for each candidate content item comprises:
identifying characteristics of a candidate content item;
identifying prior interactions by the user with additional content items having at least a threshold number of characteristics matching the characteristics of the candidate content item; and
determining the value function of the candidate content item based at least in part on the identified prior interactions.

5. The computer-implemented method of claim 1, wherein the value function of a candidate content item is less than a threshold value at a time subsequent to the current time.

6. The computer-implemented method of claim 5, wherein the time subsequent to the current time at which the value function of the candidate content item is less than the threshold value is specified by a user providing the candidate content item to the social networking system.

7. The computer-implemented method of claim 5, wherein the time subsequent to the current time at which the value function of the candidate content item is less than the threshold value is determined by the social networking system based at least in part on characteristics of the candidate content item and prior interactions by the user with additional content items having at least a threshold number of characteristics matching the characteristics of the candidate content item.

8. The computer-implemented method of claim 1, wherein selecting the combination of the plurality of combinations of the current candidate content items for inclusion in the feed of content items at the current time, such that the selection maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times comprises:
- associating weights with each predicted amount of user interaction with an adjusted combination of candidate content items, a weight associated with the adjusted combination of candidate content items based at least in part on a difference between the current time and an additional time associated with the adjusted combination of candidate content items;
- applying the weights to the predicted amounts of user interaction with each adjusted combination of candidate content items of each plurality of adjusted combinations of candidate content items at each of the plurality of additional times;
- for each of the plurality of combinations of the current candidate content items available for presentation to the user via the feed at the current time, generating an aggregation of predicted amount of user interaction with the combination of the current content items and the weighted predicted amounts of user interaction with each adjusted combination of candidate content items of each plurality of adjusted combinations of candidate content items at each of the plurality of additional times.

9. The computer-implemented method of claim 1, wherein selecting the combination of the plurality of combinations of the current candidate content items for inclusion in the feed of content items at the current time, such that the selection maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times comprises:
- determining a likelihood of the user accessing the feed of content items between the current time and a time when a value function of a candidate content item has less than a threshold measure of relevance based at least in part on prior accesses of the feed of content items and times associated with the accesses of the feed of content items associated with the user by the social networking system;
- responsive to the determined likelihood being less than a threshold likelihood, identifying combinations of the current candidate content items from the plurality of combinations of the current candidate content items for inclusion in the feed of content items at the current time, the identified combinations including the candidate content item; and
- selecting a combination from the identified combinations that maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times.

10. A computer program product comprising a computer readable storage medium having instructions encoded thereon that, when executed by a processor, cause the processor to:
- identify current candidate content items available for presentation to a user of a social networking system via a feed of content items at a current time;
- obtain a value function for each current candidate content item, the value function for a candidate content item representing a measure of relevance of the candidate content item at different times;
- for each of a plurality of combinations of the current candidate content items available for presentation to the user via the feed at the current time:
  - determine a predicted amount of user interaction with the combination of the current candidate content items at the current time by aggregating measures of relevance for the current candidate content items included in the combination of the current candidate content items based at least in part on the value functions for each of the current candidate content items included in the combination, and
  - for each of a plurality of additional times subsequent to the current time:
    - identify a plurality of adjusted combinations of candidate content items available for presentation to the user via the feed at the additional time, each adjusted combination of candidate content items based at least in part on the combination of the current candidate content items, and
    - for each of the plurality of adjusted combinations of candidate content items available for presentation to the user via the feed at the additional time:
      - determine a predicted amount of user interaction with the adjusted combination of candidate content items by aggregating measures of relevance for the candidate content items included in the adjusted combination of candidate content items based at least in part on the value functions for each of the candidate content items included in the adjusted combination of candidate content items;
- select a combination of the plurality of combinations of the current candidate content items for inclusion in the feed of content items at the current time, such that the selection maximizes an aggregate of the predicted amount of user interaction with the combination of the current content items at the current time and the predicted amounts of user interaction with each adjusted combination of candidate content items of each plurality of adjusted combinations of candidate content items at each of the plurality of additional times;
- present, at the current time, the selected combination of the current candidate content items to the user via the feed of content items; and
- for each of the plurality of additional times subsequent to the current time:
  - select an adjusted combination of the plurality of adjusted combinations of candidate content items for inclusion in the feed of content items at the additional time, such that the selection maximizes an aggregate of the predicted amount of user interaction with the adjusted combination of candidate content items at the additional time and the predicted amount of user interaction with each adjusted combination of candidate content items for each plurality of adjusted combinations of candidate content items at each additional time of the plurality of additional times that is subsequent to the additional time, by:
- determining a frequency with which the user accesses the feed of content items provided by the social networking system is less than a threshold frequency;
- responsive to the determining, identifying combinations of the current candidate content items from the plurality of combinations of the current candidate content items for inclusion in the feed of content items at the current time, the identified combinations including at least one current candidate content item having a value function with a measure of relevance less than a threshold within a time interval from the current time, the time interval associated with the threshold frequency; and
- selecting a combination from the identified that maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times; and present, at the additional time, the selected adjusted combination of candidate content items to the user via the feed of content items.

11. The computer program product of claim 10, wherein the value function of a current candidate content item varies over time at a rate and the value function of a candidate content item included in an adjusted combination of candidate content items that is not a current candidate content item varies over time at an additional rate that differs from the rate.

12. The computer program product of claim 10, wherein obtaining the value function comprises retrieving the value function associated with a candidate content item, the value function specified by a user providing the candidate content item to the social networking system.

13. The computer program product of claim 10, wherein obtaining the value function for each candidate content item comprises:
- identifying characteristics of a candidate content item;
- identifying prior interactions by the user with additional content items having at least a threshold number of characteristics matching the characteristics of the candidate content item; and
- determining the value function of the candidate content item based at least in part on the identified prior interactions.

14. The computer program product of claim 10, wherein the value function of a candidate content item is less than a threshold value at a time subsequent to the current time.

15. The computer program product of claim 14, wherein the time subsequent to the current time at which the value function of the candidate content item is less than the threshold value is specified by a user providing the candidate content item to the social networking system.

16. The computer program product of claim 14, wherein the time subsequent to the current time at which the value function of the candidate content item is less than the threshold value is determined by the social networking system based at least in part on characteristics of the candidate content item and prior interactions by the user with additional content items having at least a threshold number of characteristics matching the characteristics of the candidate content item.

17. The computer program product of claim 10, wherein select the combination of the plurality of combinations of the current candidate content items for inclusion in the feed of content items at the current time, such that the selection maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times comprises:
- associate weights with each predicted amount of user interaction with an adjusted combination of candidate content items, a weight associated with the adjusted combination of candidate content items based at least in part on a difference between the current time and an additional time associated with the adjusted combination of candidate content items;
- apply the weights to the predicted amounts of user interaction with the one or more additional feeds each adjusted combination of candidate content items of each plurality of adjusted combinations of candidate content items at each of the plurality of additional times;
- for each of the plurality of combinations of the current candidate content items available for presentation to the user via the feed at the current time, generate an aggregation of a predicted amount of user interaction with the combination of the current content items and the weighted predicted amounts of user interaction with each adjusted combination of candidate content items of each plurality of adjusted combinations of candidate content items at each of the plurality of additional times.

18. The computer program product of claim 10, wherein select the combination of the plurality of combinations of the current candidate content items for inclusion in the feed of content items at the current time, such that the selection maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times comprises:
- determine a likelihood of the user accessing the feed of content items between the current time and a time when a value function of a candidate content item has less than a threshold measure of relevance based at least in part on prior accesses of the feed of content items and times associated with the accesses of the feed of content items associated with the user by the social networking system;
- responsive to the determined likelihood being less than a threshold likelihood, identify combinations of the current candidate content items from the plurality of combinations of the current candidate content items for inclusion in the feed of content items at the current time, the identified combinations including the candidate content item; and
- select a combination from the identified combinations that maximizes the aggregate of the predicted amount of user interaction with the combination of the current content items at the current time and the predicted amounts of user interaction with each adjusted combination of candidate content items of each plurality of adjusted combinations of candidate content items at each of the plurality of additional times.

* * * * *